United States Patent
Tian et al.

(10) Patent No.: US 12,323,621 B2
(45) Date of Patent: Jun. 3, 2025

(54) DUPLICATE VERTICES BASED POSITION COMPRESSION

(71) Applicant: Tencent America LLC, Palo Alto, CA (US)

(72) Inventors: Jun Tian, Belle Mead, NJ (US); Chao Huang, Palo Alto, CA (US); Xiaozhong Xu, State College, PA (US); Xiang Zhang, Sunnyvale, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 82 days.

(21) Appl. No.: 18/207,610

(22) Filed: Jun. 8, 2023

(65) Prior Publication Data

US 2024/0048763 A1 Feb. 8, 2024

Related U.S. Application Data

(60) Provisional application No. 63/394,485, filed on Aug. 2, 2022.

(51) Int. Cl.
*H04N 19/597* (2014.01)
*H04N 19/172* (2014.01)

(52) U.S. Cl.
CPC ......... *H04N 19/597* (2014.11); *H04N 19/172* (2014.11)

(58) Field of Classification Search
None
See application file for complete search history.

(56) References Cited

U.S. PATENT DOCUMENTS

| | | | |
|---|---|---|---|
| 2008/0088626 A1* | 4/2008 | Habe | G06T 17/20 |
| | | | 375/E7.084 |
| 2018/0220156 A1* | 8/2018 | Kim | G06T 3/18 |
| 2020/0286261 A1* | 9/2020 | Faramarzi | G06T 9/001 |
| 2021/0218994 A1* | 7/2021 | Flynn | G06T 9/001 |
| 2022/0108483 A1* | 4/2022 | Graziosi | G06T 17/20 |
| 2022/0164994 A1* | 5/2022 | Joshi | G06T 9/001 |
| 2023/0068178 A1* | 3/2023 | Schwarz | G06T 9/001 |

(Continued)

OTHER PUBLICATIONS

A. S. Jarek Rossignac and A. Szymczak. 2001. 3D compression made simple: Edgebreaker on a corner table. In Proceedings of Shape Modeling International Conference, Genoa, Italy, 2001, pp. 1-7.

(Continued)

*Primary Examiner* — Stefan Gadomski
(74) *Attorney, Agent, or Firm* — ArentFox Schiff LLP

(57) ABSTRACT

Whether each of a plurality of duplicate vertices is skippable in a mesh is determined. One or more skippable duplicate vertices of the plurality of duplicate vertices in the mesh are excluded to generate an updated mesh. Vertices of the updated mesh are divided into a plurality of vertex groups, where the plurality of vertex groups includes a first vertex group. A prediction mode of the first vertex group is determined at least based on estimation errors of vertices in the first vertex group of the updated mesh. Each of the estimation errors indicates a difference between a respective vertex in the first vertex group and a corresponding reference vertex in the reference frame. Prediction information of the vertices in the first vertex group is generated based on the determined prediction mode.

20 Claims, 8 Drawing Sheets

(56) References Cited

U.S. PATENT DOCUMENTS

2023/0074094 A1\*   3/2023   Hertzmann ............. G06T 17/20
2023/0134779 A1\*   5/2023   Reinert ................... G06T 15/20
                                                                 345/420

OTHER PUBLICATIONS

Costa Touma and Craig Gotsman. 1998. Triangle Mesh Compression. In Graphics Interface 98 Conference Proceedings. pp. 1-9.
Adrien Maglo, Guillaume Lavoue, Florent Dupont, and Céline Hudelot, 2015. 3D Mesh Compression: Survey, Comparisons, and Emerging Trend. In ACM Computing Surveys, vol. 47, Issue 3, Apr. 2015 Article No. 44, pp. 1-41.
J. Xu, K. Kawamura, "[V-MESH][EE4.1 related][new] On improving mesh motion coding with skip mode of motion prediction", ISO/IEC JTC1/SC29/WG7 m60214, Online, Jul. 2022, pp. 1-5.

\* cited by examiner

DUPLICATE VERTICES BASED POSITION COMPRESSION

INCORPORATION BY REFERENCE

The present application claims the benefit of priority to U.S. Provisional Application No. 63/394,485, "Duplicate Vertices based Position Compression" filed on Aug. 2, 2022, which is incorporated by reference herein in its entirety.

TECHNICAL FIELD

The present disclosure includes embodiments related to mesh processing.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Advances in three-dimensional (3D) capture, modeling, and rendering have promoted ubiquitous presence of 3D content across various platforms and devices. Nowadays, it is possible to capture a baby's first step in one continent and allow grandparents of the baby to see (and in some cases interact) and enjoy a full immersive experience with the child in another continent. In order to achieve such realism, models are becoming ever more sophisticated, and a significant amount of data is linked to the creation and consumption of those models. 3D meshes are widely used to represent such immersive contents.

SUMMARY

Aspects of the disclosure provide methods and apparatuses for mesh processing. In some examples, an apparatus for mesh processing includes processing circuitry.

According to an aspect of the disclosure, a method of mesh processing performed in a video encoder is provided. In the method, whether each of a plurality of duplicate vertices is skippable in a mesh of a current frame is determined. Each of the plurality of duplicate vertices is a vertex of the mesh that is a duplicate of another corresponding vertex in the mesh. Each of the plurality of duplicate vertices and its corresponding vertex have a same reference vertex in a reference frame. One or more skippable duplicate vertices of the plurality of duplicate vertices in the mesh are excluded to generate an updated mesh. Vertices of the updated mesh are divided into a plurality of vertex groups based on a predetermined constant integer, where the plurality of vertex groups includes a first vertex group. A prediction mode of the first vertex group is determined at least based on estimation errors of vertices in the first vertex group of the updated mesh. Each of the estimation errors indicates a difference between a respective vertex in the first vertex group and a corresponding reference vertex in the reference frame. Prediction information of the vertices in the first vertex group is generated based on the determined prediction mode of the first vertex group.

In an example, based on a first duplicate vertex of the plurality of duplicate vertices and a vertex corresponding to the first duplicate vertex in the mesh having same coordinates, the first duplicate vertex of the plurality of duplicate vertices is determined as skippable. In an example, based on a second duplicate vertex of the plurality of duplicate vertices and a vertex corresponding to the second duplicate vertex in the mesh having different coordinates, the second duplicate vertex of the plurality of duplicate vertices is determined as non-skippable.

In some embodiments, a number of non-skippable duplicate vertices of the plurality of duplicate vertices is determined. In addition, a vertex index for each of the non-skippable duplicate vertices of the plurality of duplicate vertices is determined.

In some embodiments, based on one of (i) a number of the plurality of duplicate vertices being equal to or larger than a first threshold, (ii) a number of the vertices in the mesh being equal to or larger than a second threshold, and (iii) a ration between the number of the plurality of duplicate vertices and the number of the vertices in the mesh being equal to or larger than a third threshold, coding information is generated. The coding information indicates (i) the number of the non-skippable duplicate vertices of the plurality of duplicate vertices and (ii) the vertex index for each of the non-skippable duplicate vertices of the plurality of duplicate vertices.

In an embodiment, the number of the non-skippable duplicate vertices is coded based on one of a variable length coding, a fixed length coding, a fixed length code of (b+1)-bits, and a fixed length code with a codelength smaller than (b+1)-bits, where b is a positive integer. In an embodiment, the vertex index for each of the non-skippable duplicate vertices of the plurality of duplicate vertices is coded based on one of a differential coding, the variable length coding, a Exp-Golomb coding, the fixed length code of (b+1)-bits, and the fixed length code with the codelength smaller than (b+1)-bits.

In some embodiments, to determine the prediction mode of the first vertex group, the estimation errors of the vertices in the first vertex group of the updated mesh are determined. An average neighboring estimation error of a plurality of neighboring vertices associated with each of the vertices in the first vertex group is determined. Each of the plurality of neighboring estimation errors indicates a difference between one of the plurality of neighboring vertices of the respective vertex in the first vertex group and a reference vertex in the reference frame that corresponds to the one of the plurality of neighboring vertices of the respective vertex in the first vertex group. A first cost value is determined based on the estimation errors of the vertices in the first vertex group. A second cost value is determined based on the average neighboring estimation errors associated with the vertices of the first vertex group. The prediction mode of the first vertex group is determined based on a comparison between the first cost value and the second cost value.

In an example, to determine the average neighboring estimation error of the plurality of neighboring vertices, a first neighboring estimation error associated with a first vertex of the vertices in the first vertex group is determined. The first neighboring estimation error indicates a difference between a first neighboring vertex of the first vertex and a reference vertex in the reference frame that corresponds to the first neighboring vertex of the first vertex. A second neighboring estimation error associated with the first vertex of the vertices in the first vertex group is determined. The second neighboring estimation error indicates a difference between a second neighboring vertex of the first vertex and a reference vertex in the reference frame that corresponds to the second neighboring vertex of the first vertex. The average neighboring estimation error of the first neighboring estimation error and the second neighboring estimation error is determined, where the average neighboring estimation error is associated with the first vertex of the vertices in the first vertex group.

In some embodiments, the first cost value is determined as a sum of the estimation errors of the vertices in the first vertex group.

In some embodiments, to determine the second cost value, an estimation difference between the estimation error of each of the vertices in the first vertex group and the average neighboring estimation error associated with the corresponding vertex in the first vertex group is determined. The second cost value is determined as a sum of the estimation differences associated with the vertices in the first vertex group.

In an example, the prediction mode is determined as a first mode based on the first cost value being equal to or less than the second cost value. In an example, the prediction mode is determined as a second mode based on the first cost value being larger than the second cost value.

In some embodiments, based on the prediction mode being the first mode, a first prediction residue is generated for each of the vertices in the first vertex group, where the first prediction residue indicates the estimation error of the corresponding vertex in the first vertex group. Based on the prediction mode being the second mode, a second prediction residue is generated for each of the vertices in the first vertex group, where the second prediction residue indicates the estimation difference associated with the corresponding vertex in the first vertex group.

According to another aspect of the disclosure, an apparatus is provided. The apparatus includes processing circuitry. The processing circuitry can be configured to perform any of the described methods for mesh processing.

Aspects of the disclosure also provide a non-transitory computer-readable medium storing instructions which when executed by a computer cause the computer to perform any of the described methods for mesh processing.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
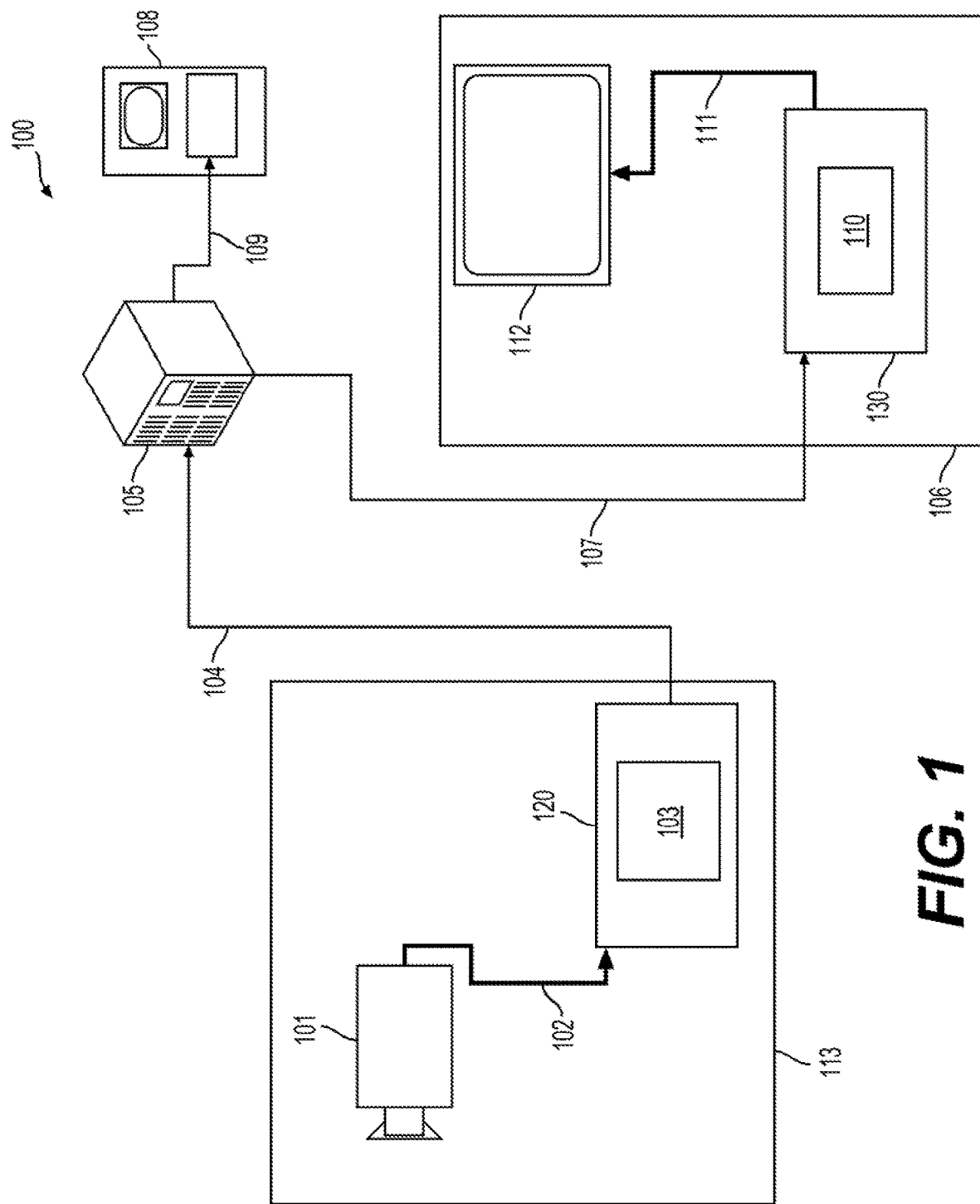
FIG. 1 is a schematic illustration of an exemplary block diagram of a communication system (100).

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other image and video enabled applications, including, for example, video conferencing, digital TV, streaming services, storing of compressed video on digital media including CD, DVD, memory stick and the like.

The video processing system (100) includes a capture subsystem (113), that can include a video source (101). The video source (101) can include one or more images captured by a camera and/or generated by a computer. For example, a digital camera can create a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
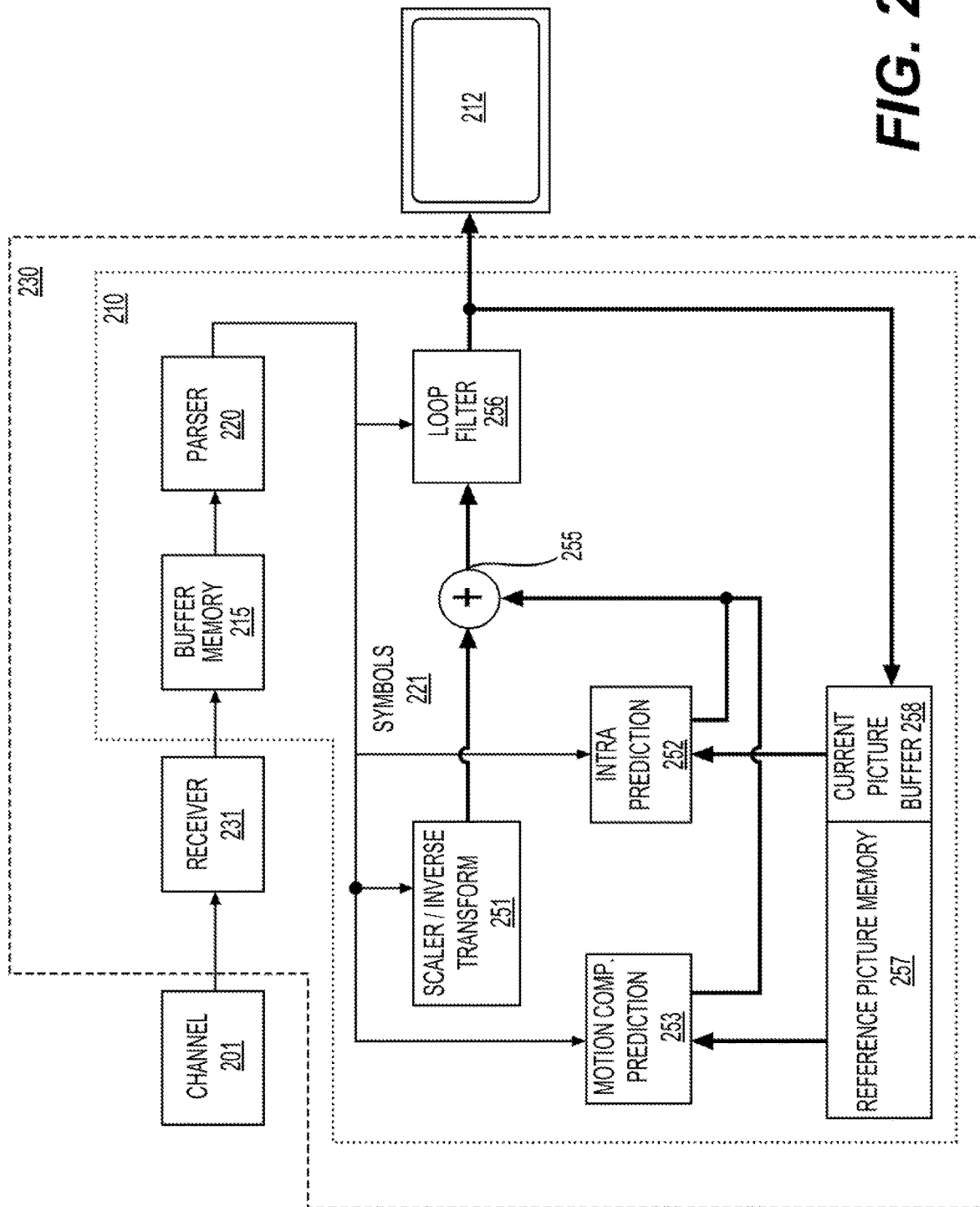
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231). The receiver (231) may include receiving circuitry, such as network interface circuitry. The video decoder (210) can be used in the place of the video decoder (110) in the FIG. 1 example.

The receiver (231) may receive one or more coded video sequences to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220). The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
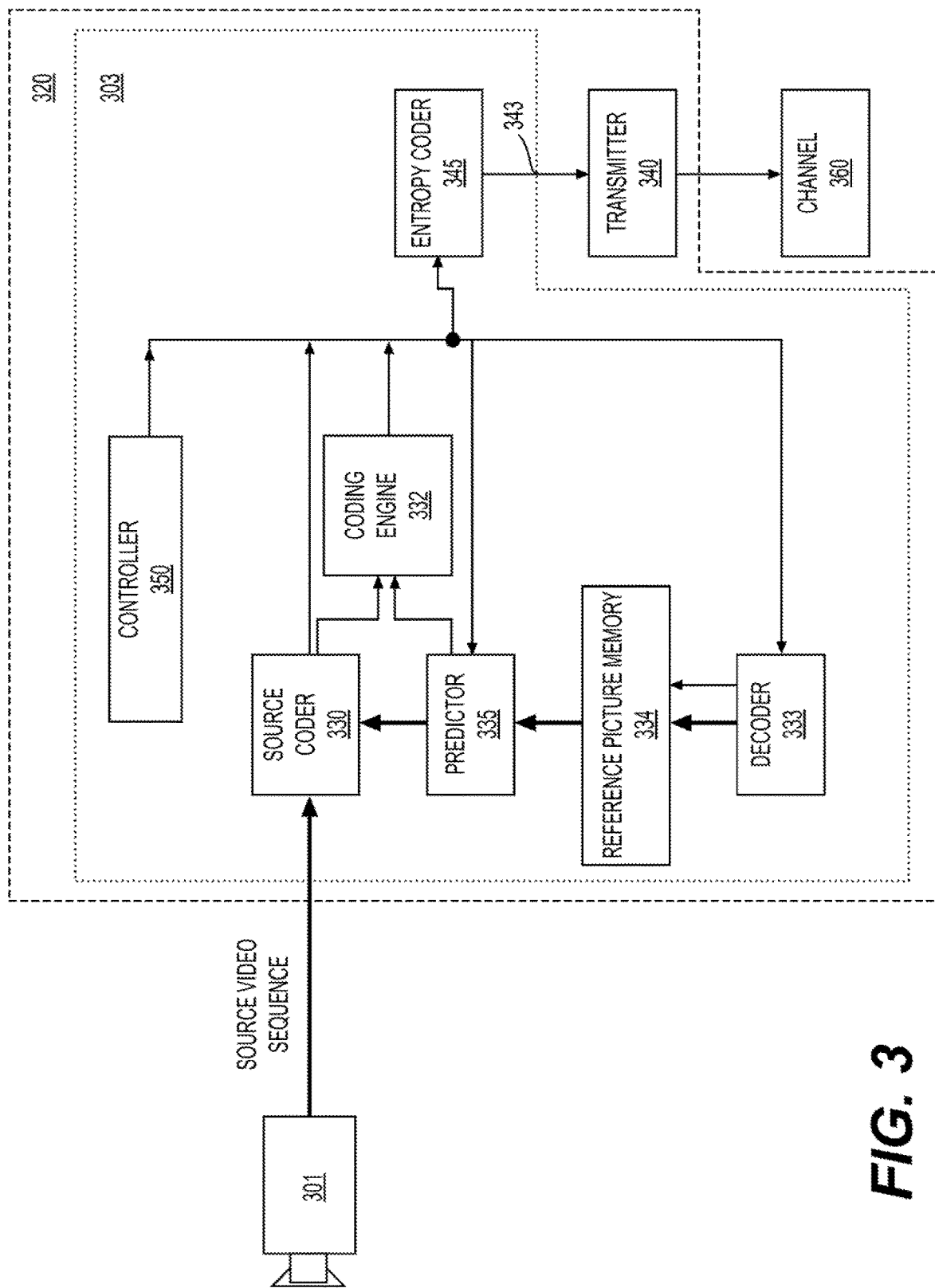
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc., in use. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as of a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks, such as a polygon-shaped or triangular block. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

The disclosure includes embodiments related to methods and systems of mesh vertex position compression using duplicate vertices. In some embodiments, each of the duplicate vertices in a mesh is a duplicate of another corresponding vertex in the mesh of a current frame. Each of the duplicate vertices and its corresponding vertex can have a same reference vertex in a reference frame.

A mesh can include several polygons that describe a surface of a volumetric object. Each polygon of the mesh can be defined by vertices of the corresponding polygon in a three-dimensional (3D) space and information of how the vertices are connected, which can be referred to as connectivity information. In some embodiments, vertex attributes, such as colors, normals, etc., can be associated with the mesh vertices. Attributes (or vertex attributes) can also be associated with the surface of the mesh by exploiting mapping information that parameterizes the mesh with two-dimensional (2D) attribute maps. Such mapping can usually be described by a set of parametric coordinates, referred to as UV coordinates or texture coordinates, associated with the mesh vertices. 2D attribute maps can be used to store high resolution attribute information such as texture, normals, displacements etc. Such information can be used for various purposes such as texture mapping and shading.

A dynamic mesh sequence may require a large amount of data since the dynamic mesh can include a significant amount of information changing over time. Therefore, efficient compression technologies are required to store and transmit such contents. Mesh compression standards, such as IC, MESHGRID, and FAMC, were previously developed by MPEG to address dynamic meshes with a constant connectivity, a time varying geometry, and vertex attributes. However, these standards may not consider time varying attribute maps and connectivity information. DCC (Digital Content Creation) tools usually generate such dynamic meshes. However, it can be challenging for volumetric acquisition techniques to generate a constant connectivity dynamic mesh, especially under real time constraints. This type of content (e.g., a constant connectivity dynamic mesh) may not be supported by existing standards. MPEG is planning to develop a new mesh compression standard to directly handle dynamic meshes with time varying connectivity information and optionally time varying attribute maps. The new mesh compression standard targets lossy and lossless compression for various applications, such as real-time communications, a storage, a free viewpoint video, Augmented Reality (AR), and Virtual Reality (VR). Functionalities, such as a random access and a scalable/progressive coding, can also be considered.

Mesh geometry information can include vertex connectivity information, 3D coordinates, and 2D texture coordinates, etc. Compression of vertex 3D coordinates, which may also be referred to as vertex positions, can be important because, in many cases, compression of the vertex 3D coordinates can consume a significant portion of the entire geometry related data.

A dynamic mesh sequence M at a time instance t can be denoted as M(t). M(t) can be referred to as a positionally tracked frame, if there is a mapping (or mapping operation) f from vertex positions of M(t) to vertex positions at another time instance $M(t_0)$, where t and $t_0$ are different time instances. Accordingly, $M(t_0)$ can be referred to as a reference frame, and corresponding vertices in the reference frame can be referred to as reference vertices of the vertices in M(t).

In this disclosure, methods and/or systems are proposed for mesh vertex position compression using duplicate vertices. Note that the methods and/or systems can be applied individually or by any form of combinations. Further, the disclosed methods and systems are not limited to the vertex position compression. The disclosed methods and systems can also be applied to, for example, a two-dimensional (2D) texture coordinate compression or a more general temporal prediction-based scheme.

Figure 4:
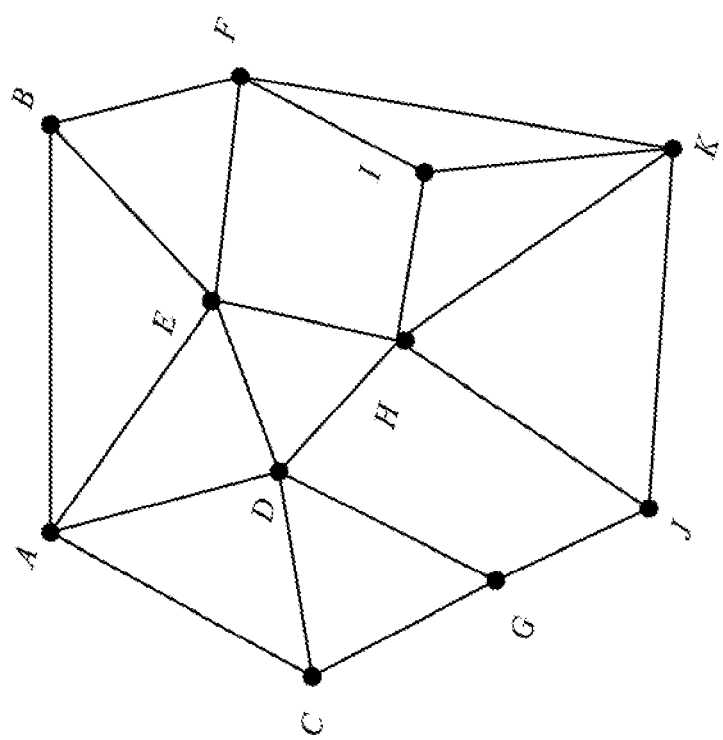
FIG. 4 is a schematic illustration of vertices in a mesh according to some embodiments of the disclosure.

For a vertex V in a positionally tracked frame M(t), neighbors of the vertex can also be vertices that are connected to V through edges, and these vertices are referred to as neighbor vertices (or neighboring vertices) of V. For example, as shown in FIG. 4, a vertex A can have four neighbor vertices, which are C, D, E, and B. A vertex E can have five neighbor vertices, which are A, B, F, H, and D.

For a positionally track frame M(t) and its reference frame $M(t_0)$, assume f is the mapping between vertex positions of M(t) and $M(t_0)$. Given a vertex V in M(t), the vertex V can be denoted as a duplicate vertex if a reference vertex f(V) of the vertex V and a reference vertex $f(\overline{V})$ of a coded vertex $\overline{V}$ in M(t) have same position values, where the references f(V) and $f(\overline{V})$ are vertices in the reference frame $M(t_0)$. In an embodiment, a coded vertex implies that a coding order of $\overline{V}$ comes prior to V. In an embodiment, subscripts x, y, z can be denoted as 3D coordinates in a xyz space. Therefore, a duplicate vertex V can be described based on equations (1)-(3) as follows:

$$(f(V))_x = (f(\overline{V}))_x \qquad \text{Eq. (1)}$$

$$(f(V))_y = (f(\overline{V}))_y \qquad \text{Eq. (2)}$$

$$(f(V))_z = (f(\overline{V}))_z \qquad \text{Eq. (3)}$$

In an embodiment, for a duplicate vertex V, V can be denoted as a skippable duplicate if V and $\overline{V}$ have same position values. Thus, a skippable duplicate vertex V can be described based on equations (4)-(6) as follows:

$$V_x = \overline{V}_x \quad \text{Eq. (4)}$$

$$V_y = \overline{V}_y \quad \text{Eq. (5)}$$

$$V_z = \overline{V}_z \quad \text{Eq. (6)}$$

Otherwise, V can be denoted as a non-skippable duplicate.

Figure 5:
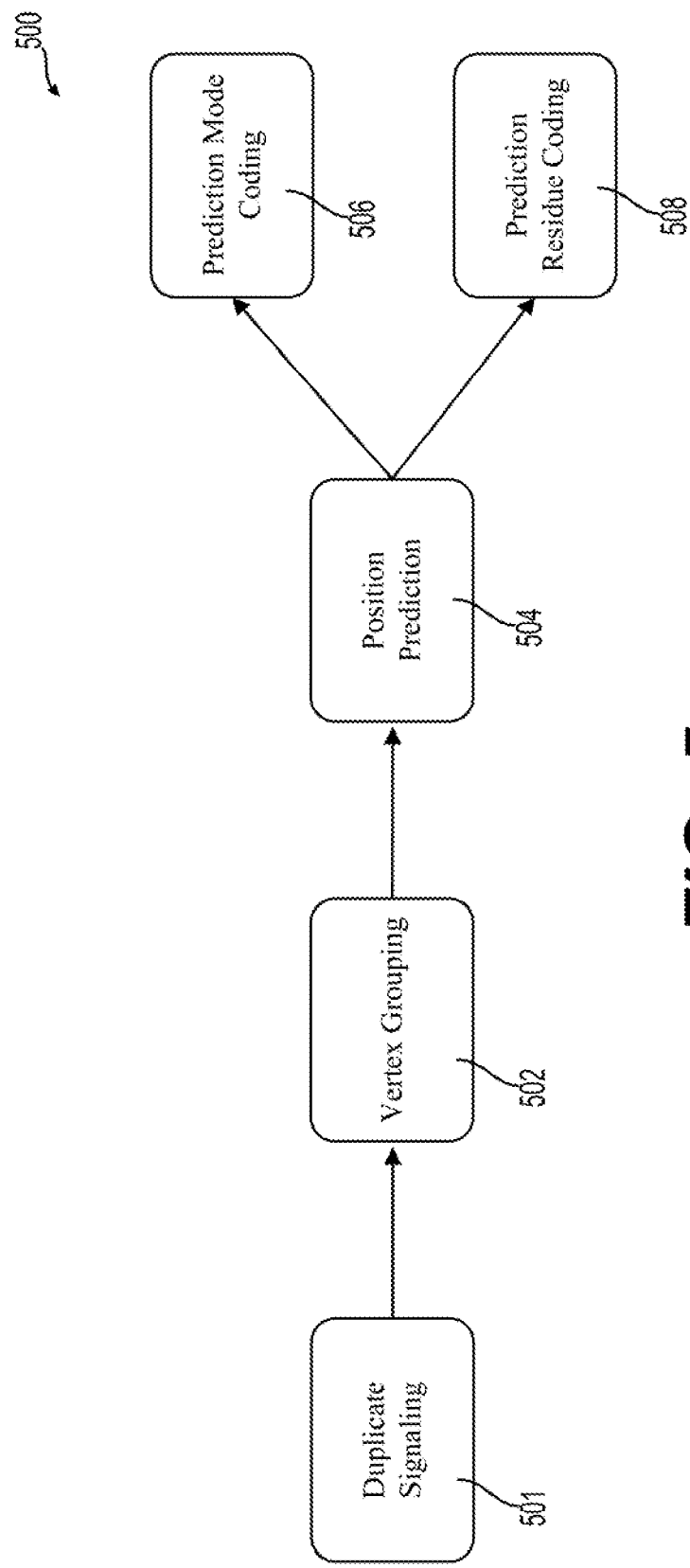
FIG. 5 is a schematic illustration of an exemplary vertex position compression according to some embodiments of the disclosure.

FIG. 5 is a schematic diagram of an exemplary vertex position compression apparatus (or apparatus) (500) according to some embodiments of the disclosure. As shown in FIG. 5, the vertex position compression apparatus (500) can include a duplicate signaling module (501) configured to determine whether a duplicate vertex is skippable. The duplicate signaling module (501) can also be configured to signal (transmit) vertex indices of the skippable duplicate vertices or vertex indices of the non-skippable duplicate vertices. The apparatus (500) can include a vertex grouping module (502) configured to group vertices of a mesh, a position prediction module (504) configured to calculate prediction positions of vertices, a prediction mode coding module (506) configured to code (or determine) a prediction mode of the position compression, and a prediction residue coding module (508) configured to code a position prediction residue.

The term module in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

For a positionally tracked frame M(t), duplicate vertices can be identified using a reference frame $M(t_0)$. For each duplicate vertex V, it can be determined as either a skippable duplicate or a non-skippable duplicate. In an embodiment, a set S can be denoted as collection of skippable duplicates and a set NS can be denoted as collection of non-skippable duplicates.

In an embodiment, an encoder can signal vertex indices of non-skippable duplicates. In an example, the set NS can be defined as NS={$d_1, d_2, \ldots, d_s$}, where $0 \leq d_1 < d_2 < \ldots < d_s \leq T-1$, $d_i$ is a vertex index of a i-th non-skippable duplicate, s is a number (or count) of the non-skippable duplicate vertices, and T is a number (or count) of vertices of M(t). In an example, $s \geq 0$ and $T \geq 3$. When s=0, the set NS can be an empty set and all duplicate vertices are skippable. The encoder can code the number s and each index $d_i$ for duplicate signaling.

The number s can be coded based a variety of coding methods. In an embodiment, the number s can be coded using a variable length coding. In an embodiment, the number s can be coded using a fixed length coding. In an embodiment, the number s can be coded using a fixed length code of (b+1)-bits, where b can be a largest integer less than or equal to $\log_2(T)$. In an embodiment, the number s can be coded using a fixed length code, where a codelength is smaller than (b+1)-bits, and b is the largest integer less than or equal to $\log_2(T)$. As s may be coded using more than one fixed length codes, a first bit (or a last bit) in each fixed length code can be signaled to indicate whether the respective fixed length code is a representation of a new symbol or a continuation of a last (or previous) symbol The vertex index $d_i$ can be coded based on various coding methods. In an embodiment, the vertex index $d_i$ can be coded using a differential coding. In the differential coding, a plurality of parameters $D_i$ ($i \geq 1$) can be coded by the encoder. The parameters $D_i$ can be defined as $D_1 = d_1$ (i=1) and $D_i = d_i - d_{i-1} - 1$ ($i \geq 2$). Accordingly, the vertex indices of the non-skippable vertices can be represented based on coded $D_i$ ($i \geq 1$).

In an embodiment, $D_i$ can be coded using a variable length coding. In an embodiment, $D_i$ can be coded using an Exp-Golomb code. In an embodiment, $D_i$ can be coded using a fixed length coding. In an embodiment, $D_i$ can be coded using a fixed length code of (B+1)-bits, where B is a largest integer less than or equal to $\log_2(T-2)$. In an embodiment, $D_i$ can be coded using a fixed length code, where a codelength is smaller than (B+1)-bits, and B is a largest integer less than or equal to $\log_2(T-2)$. As $D_i$ may be coded using more than one fixed length codes, a first bit (or last bit) in each fixed length code can be signaled to indicate whether the respective fixed length code is a representation of a new symbol or a continuation of a last (or previous) symbol.

In some embodiments, vertex indices of skippable duplicates (or duplicate vertices) can be signaled.

In some embodiments, the encoder can adaptively turn on or turn off duplicate signaling. The adaptive decision of turning on or turning off the duplicate signaling can be based on vertex statistics. In an example, the adaptive decision of turning on or turning off the duplicate signaling can be based on a number (or a count) of duplicate vertices. If the number of duplicate vertices is larger than or equal to a threshold, duplicate signaling can be turned on. Otherwise, the duplicate signaling can be turned off. In an example, the adaptive decision of turning on or turning off duplicate signaling can be based on a number (or a count) of vertices, T. If the number of the vertices T is larger than or equal to a threshold, duplicate signaling can be turned off. Otherwise, the duplicate signaling can be turned on. In an example, the adaptive decision of turning on or turning off duplicate signaling can be based on a ratio between the number of duplicate vertices and the number of vertices. If the ratio is larger than or equal to a threshold, the duplicate signaling can be turned on. Otherwise, the duplicate signaling can be turned off.

In the disclosure, vertices of a positionally tracked frame M(t) can be partitioned into groups, where each group can contain K vertices, and K is a constant. For example, the vertices of M(t) can be partitioned into a plurality of groups, and each group can include 10 vertices (K=10). In an example, if K=1, then each group contains one vertex. Yet in another example, if K is equal to the number of vertices in the frame M(t), then all vertices are included in a same group.

In an embodiment of the disclosure, skippable duplicates (or skippable duplicate vertices) can be skipped (or removed) when vertices in M(t) are partitioned in groups. For example, the vertices of M(t) are partitioned into groups, where each group contains 10 vertices. If first 12 vertices in M(t) have 2 skippable duplicates, then a first group of M(t) can be formed based on vertices with indices from 0 to 11, where the 2 skippable duplicates in the first 12 vertices are removed.

In another embodiment, all vertices, including skippable duplicates, can be considered (or included) when the M(t) is partitioned into groups.

In the disclosure, a temporal prediction can be applied to predict a vertex in a current frame based on a reference vertex in a reference frame. For a vertex V in a positionally tracked frame (or a current frame) M(t), a position of the vertex V can be estimated by a position of a reference vertex f(V) in a reference frame (e.g., M($t_0$), $t_0$ is a different time instance), where f is a mapping operation between M(t) and the reference frame. In some embodiments, the vertex V and the reference vertex f(V) in the reference frame are collocated. Thus, the reference vertex can have a same relative position in the reference frame as the vertex in the current frame M(t). When the vertex V is predicted by the reference vertex f(V), an estimation error E can be determined as a difference between the positions of V and the position of f(V) in equation (7).

$$E = V - f(V) \qquad \text{Eq. (7)}$$

As each vertex in the frame M(t) can have 3D coordinates, 3D coordinate components of the estimation error E can be provided based on equation (1). For example, assume subscripts x, y, z denote 3D coordinates in an xyz space, then the 3D coordinate components of the estimation error E can be provided in equations (8)-(10).

$$E_x = V_x - (f(V))_x \qquad \text{Eq. (8)}$$

$$E_y = V_y - (f(V))_y \qquad \text{Eq. (9)}$$

$$E_z = V_z - (f(V))_z \qquad \text{Eq. (10)}$$

The estimation error E of the vertex V can be predicted, or otherwise determined, from neighbors (or neighboring vertices) of the vertex V. For a neighbor vertex (or neighboring vertex) of V, if the neighboring vertex has been coded and can be used for prediction, an estimation error of the neighboring vertex can be applied to predict E.

Assume V has N neighbor vertices (or neighboring vertices) $V_1, V_2, \ldots, V_N$ that have been coded and can be used for prediction. For a neighbor vertex $V_i$, an estimation error (or a neighboring estimation error) of the neighbor vertex $V_i$ can be determined as $E_i = V_i - f(V_i)$, for i=1, 2, . . . , N. $f(V_i)$ can be a reference vertex for the neighbor vertex $V_i$ in a reference frame. $E_i$ can also be referred to as neighboring estimation errors associated with the vertex V and each $E_i$ can be a prediction candidate of E.

If N>=2, more than one estimation errors $E_i$ are available. In an embodiment, an average estimation error (or average neighboring estimation error) $E_0$ of the estimation errors $E_i$ can be defined in equation (11) as follows:

$$E_0 = (E_1 + E_2 + \ldots + E_N)/N \qquad \text{Eq. (11)}$$

For a group G in the frame M(t), an encoder can determine a coding cost C0 and a coding cost C1. The C0 can indicate a sum of estimation errors E of all vertices in the group G. For example, when an estimation error E for each of the vertices in the group G is determined, such as based on equation (1), the coding cost C0 can be determined as the sum of the estimation errors E of the vertices in the group G. The C1 can indicate a sum of estimation residues (E–$E_0$) for all the vertices in the group G. To determine the coding cost C1, estimation errors E of neighboring vertices of each of the vertices in the group G can be determined, such as $E_i = V_i - f(V_i)$. Further, an average neighboring estimation error $E_0$ of the estimation errors $E_i$ can be determined, such as based on equation (5). An estimation residue (or estimation difference) (E–$E_0$) can be determined for each of the vertices in the group G. The coding cost C1 can be determined as a sum of the estimation residues associated with the vertices of the group G.

In the disclosure, a prediction mode can be determined based on the coding cost C0 and the coding cost C1.

If the coding cost of C0 is less than or equal to C1, for the group G, a prediction mode 0 is applied. The prediction mode 0 indicates that a prediction residue for each of the vertices in the group G is set as the estimation error E of the respective vertex. Accordingly, in a decoder side, the respective vertex in the group G can be reconstructed as V=f(V)+E, where f(V) is the reference vertex in the reference frame M($t_0$) that corresponds to the respective vertex in the group G of the frame M(t).

If the coding cost of C0 is greater than C1, then for the group G, a prediction mode 1 is applied. The prediction mode 1 indicates that a prediction residue for each of the vertices in the group G is set as (E–$E_0$), where the E is the estimation error of the respective vertex and $E_0$ is the average estimation error of the estimation errors of the neighboring vertices of the respective vertex. Accordingly, in a decoder side, the respective vertex in the group G can be reconstructed as V=f(V)+(E–$E_0$), where f(V) is the reference vertex in the reference frame M($t_0$) that corresponds to the respective vertex in the group G of the frame M(t).

In the disclosure, a prediction mode of a group G can be coded. The prediction mode can be a binary digit, such as 0 or 1. In an embodiment, the prediction mode can be coded using an entropy coding. In an embodiment, the prediction mode can be coded using an arithmetic coding. In an embodiment, the prediction mode can be coded using a context based arithmetic coding, such as a context-adaptive binary arithmetic coding (CABAC). In an embodiment, the prediction mode can be coded using a spatial context based arithmetic coding, where the context can be conditioned on (or based on) previous coded groups of a same frame.

In an embodiment, when prediction modes in a reference frame (e.g., M($t_0$)) were already coded and are available, prediction modes of groups in a frame M(t) can be coded using a temporal context, such as a temporal context based arithmetic coding. Thus, a prediction mode of a group in the frame M(t) can be determined based on a prediction mode of a corresponding (or associated) group in the reference frame based on the temporal context based arithmetic coding. The reason is because each vertex in the group of the frame M(t) has a corresponding reference vertex in the associated group of the reference frame, a one-to-one association between the group of the positionally tracked frame M(t) and the associated group in the reference frame M($t_0$) can also be established. The associated group in the reference frame (e.g., M($t_0$), $t_0$ is a different time instance from t) can be referred to as a reference group.

In an embodiment, a logic operation (or a flag), such as XOR (Exclusive OR), that indicates a relation between a prediction mode of a group G and a prediction mode of a reference group of the group G can be coded. Thus, if the group G and the reference group have a same prediction mode, the logic operation XOR can be coded as 0. If the group G and the reference group have different prediction modes, the logic operation XOR can be coded as 1.

In an embodiment, a binary flag (e.g., 0 or 1) representing whether a group G and a reference group of the group G have a same prediction mode can be coded. Thus, if the group G and the reference group have the same prediction mode, a binary digit 1 can be coded. If the group G and the reference group have different prediction modes, a binary digit 0 can be coded.

In an embodiment, a prediction mode of a group G in a positionally tracked frame M(t) can be coded using a temporal context based arithmetic coding, where the context of the temporal context based arithmetic coding can be based on a prediction mode of a reference group of the group G.

In some embodiments, the prediction residue (e.g., E or (E−E$_0$)) can be coded using a coding algorithm, such as a fixed length coding, an exponential-Golomb coding, an arithmetic coding, or the like. In some embodiments, the prediction residue can go through a compactization transform, such as a fast Fourier transform (FFT), a discrete cosine transform (DCT), a discrete sine transform (DST), a discrete wavelet transform (DWT), or the like. An output from the compactization transform can be coded using a coding algorithm, such as a fixed length coding, an exponential-Golomb coding, an arithmetic coding, or the like.

Figure 6:
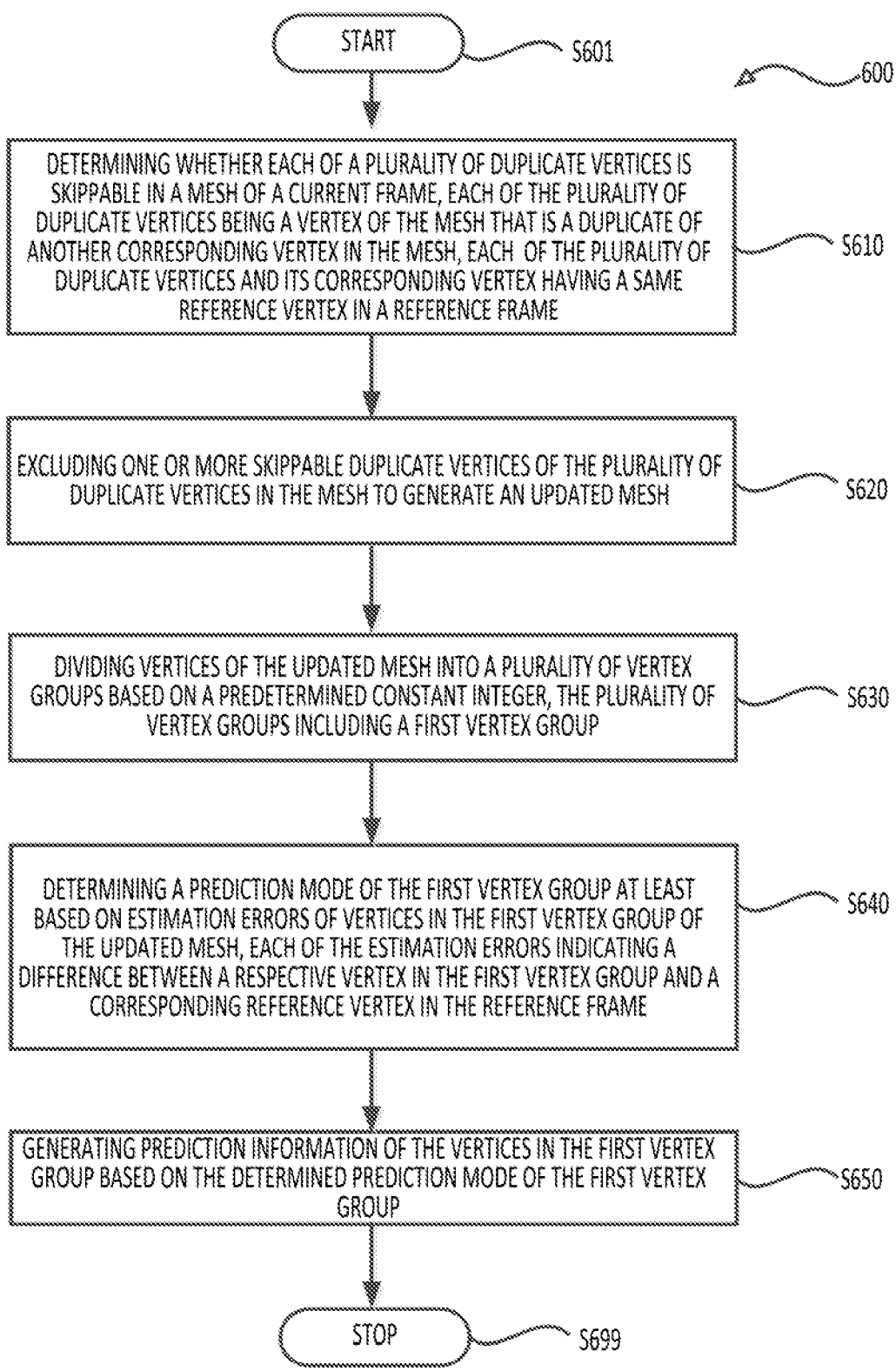
FIG. 6 shows a flow chart outlining a process according to some embodiments of the disclosure.

FIG. 6 shows a flow chart outlining a process (600) according to an embodiment of the disclosure. The process (600) can be used in an encoder, such as a video encoder. In various embodiments, the process (600) is executed by processing circuitry, such as the processing circuitry that performs functions of the video encoder (103), the processing circuitry that performs functions of the video encoder (303), and the like. In some embodiments, the process (600) is implemented in software instructions, thus when the processing circuitry executes the software instructions, the processing circuitry performs the process (600). The process starts at (S601) and proceeds to (S610).

At (S610), whether each of a plurality of duplicate vertices is skippable in a mesh of a current frame is determined. Each of the plurality of duplicate vertices is a vertex of the mesh that is a duplicate of another corresponding vertex in the mesh. Each of the plurality of duplicate vertices and its corresponding vertex have a same reference vertex in a reference frame.

At (S620), one or more skippable duplicate vertices of the plurality of duplicate vertices in the mesh are excluded to generate an updated mesh.

At (S630), vertices of the updated mesh are divided into a plurality of vertex groups based on a predetermined constant integer, where the plurality of vertex groups includes a first vertex group.

At (S640), a prediction mode of the first vertex group is determined at least based on estimation errors of vertices in the first vertex group of the updated mesh. Each of the estimation errors indicates a difference between a respective vertex in the first vertex group and a corresponding reference vertex in the reference frame.

At (S650), prediction information of the vertices in the first vertex group is generated based on the determined prediction mode of the first vertex group.

In an example, based on a first duplicate vertex of the plurality of duplicate vertices and a vertex corresponding to the first duplicate vertex in the mesh having same coordinates, the first duplicate vertex of the plurality of duplicate vertices is determined as skippable. In an example, based on a second duplicate vertex of the plurality of duplicate vertices and a vertex corresponding to the second duplicate vertex in the mesh having different coordinates, the second duplicate vertex of the plurality of duplicate vertices is determined as non-skippable.

In some embodiments, a number of non-skippable duplicate vertices of the plurality of duplicate vertices is determined. In addition, a vertex index for each of the non-skippable duplicate vertices of the plurality of duplicate vertices is determined.

In some embodiments, based on one of (i) a number of the plurality of duplicate vertices being equal to or larger than a first threshold, (ii) a number of the vertices in the mesh being equal to or larger than a second threshold, and (iii) a ration between the number of the plurality of duplicate vertices and the number of the vertices in the mesh being equal to or larger than a third threshold, coding information is generated. The coding information indicates (i) the number of the non-skippable duplicate vertices of the plurality of duplicate vertices and (ii) the vertex index for each of the non-skippable duplicate vertices of the plurality of duplicate vertices.

In an embodiment, the number of the non-skippable duplicate vertices is coded based on one of a variable length coding, a fixed length coding, a fixed length code of (b+1)-bits, and a fixed length code with a codelength smaller than (b+1)-bits, where b is a positive integer. In an embodiment, the vertex index for each of the non-skippable duplicate vertices of the plurality of duplicate vertices is coded based on one of a differential coding, the variable length coding, a Exp-Golomb coding, the fixed length code of (b+1)-bits, and the fixed length code with the codelength smaller than (b+1)-bits.

In some embodiments, to determine the prediction mode of the first vertex group, the estimation errors of the vertices in the first vertex group of the updated mesh are determined. An average neighboring estimation error of a plurality of neighboring vertices associated with each of the vertices in the first vertex group is determined. Each of the plurality of neighboring estimation errors indicates a difference between one of the plurality of neighboring vertices of the respective vertex in the first vertex group and a reference vertex in the reference frame that corresponds to the one of the plurality of neighboring vertices of the respective vertex in the first vertex group. A first cost value is determined based on the estimation errors of the vertices in the first vertex group. A second cost value is determined based on the average neighboring estimation errors associated with the vertices of the first vertex group. The prediction mode of the first vertex group is determined based on a comparison between the first cost value and the second cost value.

In an example, to determine the average neighboring estimation error of the plurality of neighboring vertices, a first neighboring estimation error associated with a first vertex of the vertices in the first vertex group is determined. The first neighboring estimation error indicates a difference between a first neighboring vertex of the first vertex and a reference vertex in the reference frame that corresponds to the first neighboring vertex of the first vertex. A second neighboring estimation error associated with the first vertex of the vertices in the first vertex group is determined. The second neighboring estimation error indicates a difference between a second neighboring vertex of the first vertex and a reference vertex in the reference frame that corresponds to the second neighboring vertex of the first vertex. The average neighboring estimation error of the first neighboring estimation error and the second neighboring estimation error is determined, where the average neighboring estimation error is associated with the first vertex of the vertices in the first vertex group.

In some embodiments, the first cost value is determined as a sum of the estimation errors of the vertices in the first vertex group.

In some embodiments, to determine the second cost value, an estimation difference between the estimation error of each of the vertices in the first vertex group and the average neighboring estimation error associated with the corresponding vertex in the first vertex group is determined. The second cost value is determined as a sum of the estimation differences associated with the vertices in the first vertex group.

In an example, the prediction mode is determined as a first mode based on the first cost value being equal to or less than the second cost value. In an example, the prediction mode is determined as a second mode based on the first cost value being larger than the second cost value.

In some embodiments, based on the prediction mode being the first mode, a first prediction residue is generated for each of the vertices in the first vertex group, where the first prediction residue indicates the estimation error of the corresponding vertex in the first vertex group. Based on the prediction mode being the second mode, a second prediction residue is generated for each of the vertices in the first vertex group, where the second prediction residue indicates the estimation difference associated with the corresponding vertex in the first vertex group.

Then, the process proceeds to (S699) and terminates.

The process (600) can be suitably adapted. Step(s) in the process (600) can be modified and/or omitted. Additional step(s) can be added. Any suitable order of implementation can be used.

Figure 7:
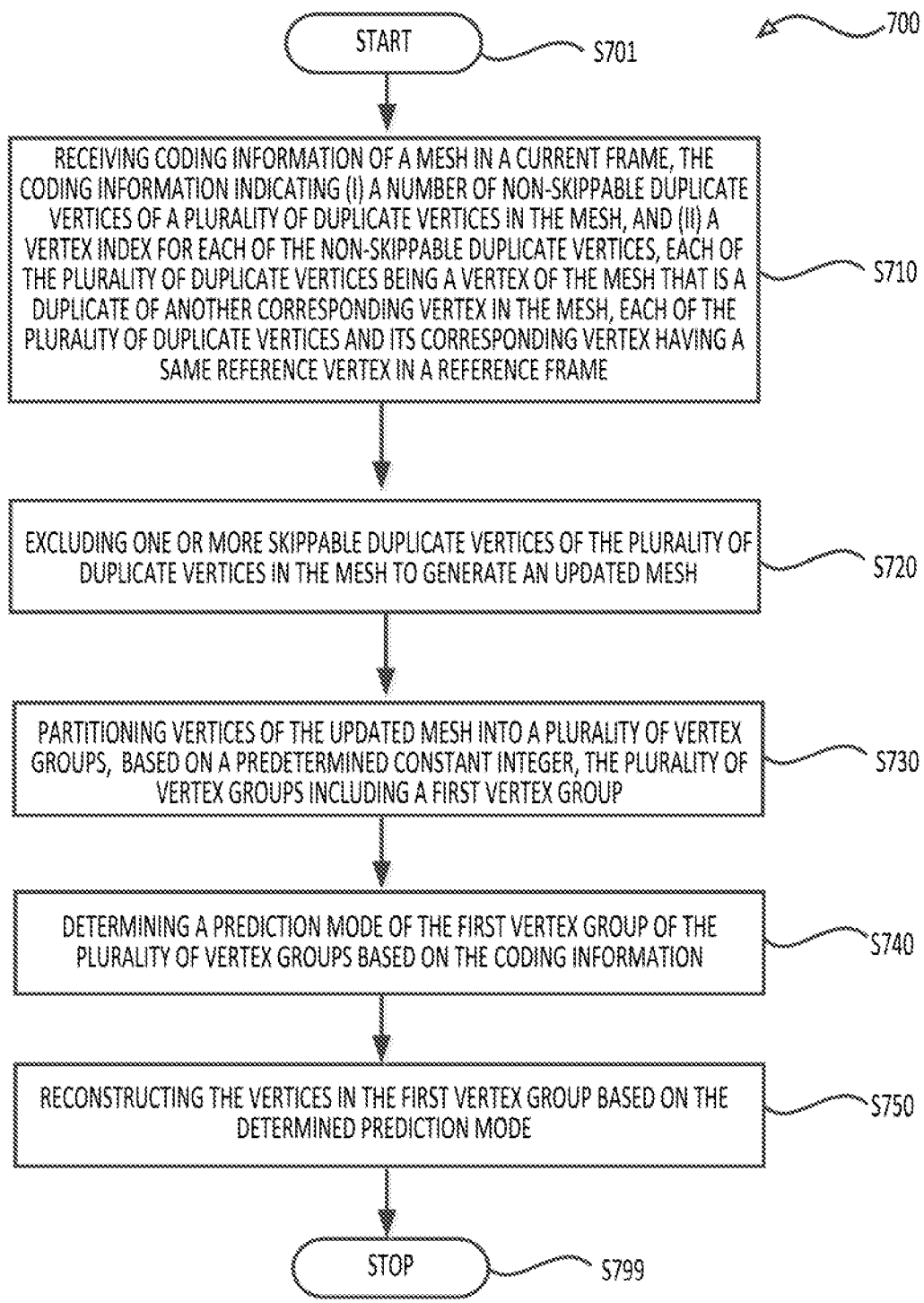
FIG. 7 shows a flow chart outlining another process according to some embodiments of the disclosure.

FIG. 7 shows a flow chart outlining a process (700) according to an embodiment of the disclosure. The process (700) can be used in a decoder, such as a video decoder. In various embodiments, the process (700) is executed by processing circuitry, such as the processing circuitry that performs functions of the video decoder (110), the processing circuitry that performs functions of the video decoder (210), and the like. In some embodiments, the process (700) is implemented in software instructions, thus when the processing circuitry executes the software instructions, the processing circuitry performs the process (700). The process starts at (S701) and proceeds to (S710).

At (S710), coding information of a mesh in a current frame is received. The coding information indicates (i) a number of non-skippable duplicate vertices of a plurality of duplicate vertices in the mesh, and (ii) a vertex index for each of the non-skippable duplicate vertices. Each of the plurality of duplicate vertices is a vertex of the mesh that is a duplicate of another corresponding vertex in the mesh. Each of the plurality of duplicate vertices and its corresponding vertex have a same reference vertex in a reference frame.

At (S720), one or more skippable duplicate vertices of the plurality of duplicate vertices in the mesh are excluded to generate an updated mesh.

At (S720), vertices of the updated mesh are partitioned into a plurality of vertex groups based on a predetermined constant integer, where the plurality of vertex groups includes a first vertex group.

At (S730), a prediction mode of the first vertex group of the plurality of vertex groups is determined based on the coding information.

At (S740), the vertices in the first vertex group are reconstructed based on the determined prediction mode.

Then, the process proceeds to (S799) and terminates.

The process (700) can be suitably adapted. Step(s) in the process (700) can be modified and/or omitted. Additional step(s) can be added. Any suitable order of implementation can be used.

The techniques described above, can be implemented as computer software using computer-readable instructions and physically stored in one or more computer-readable media.

Figure 8:
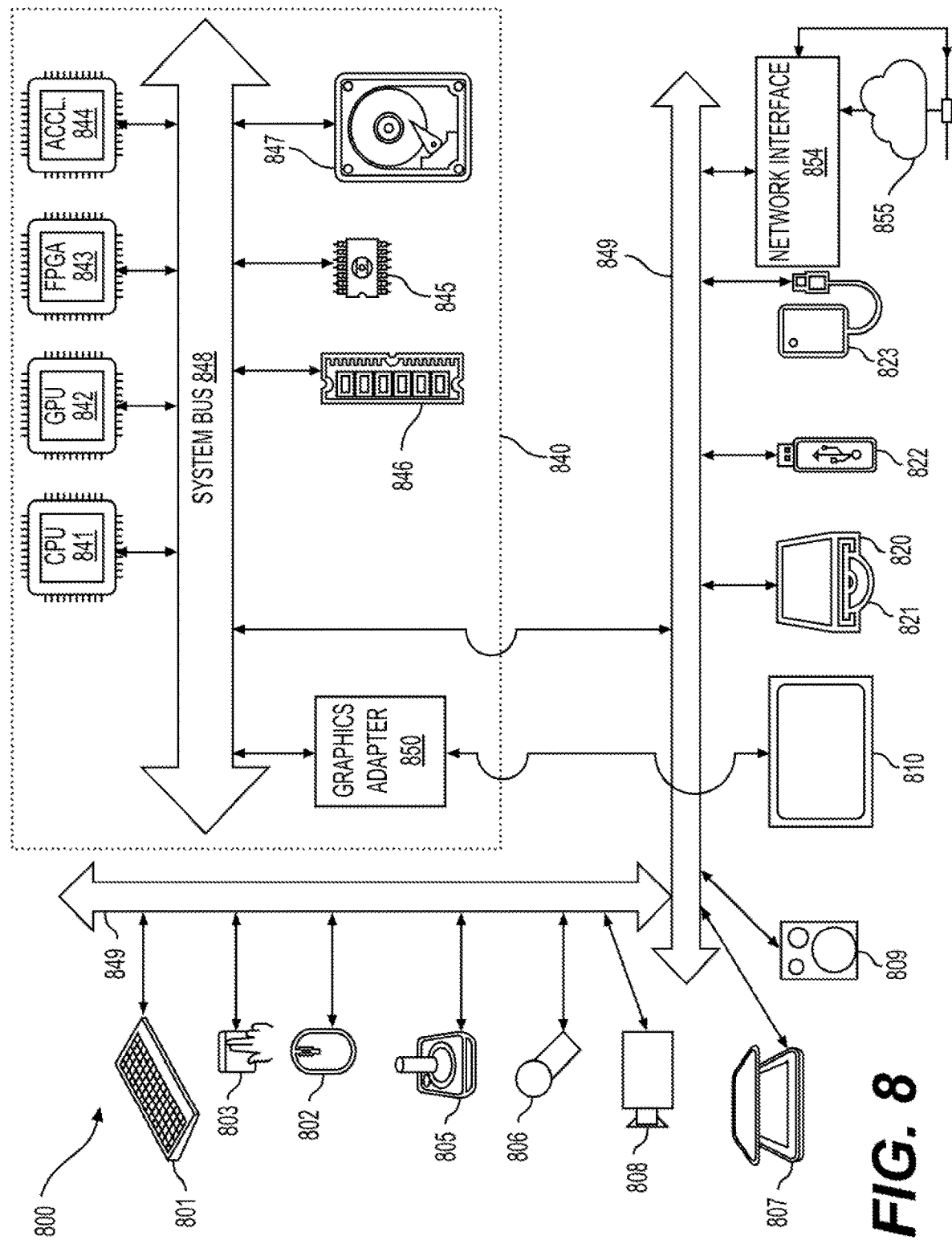
FIG. 8 is a schematic illustration of a computer system in accordance with an embodiment.

For example, FIG. 8 shows a computer system (800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 8 for computer system (800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (800).

Computer system (800) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (801), mouse (802), trackpad (803), touch screen (810), data-glove (not shown), joystick (805), microphone (806), scanner (807), camera (808).

Computer system (800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (810), data-glove (not shown), or joystick (805), but there can also be tactile feedback devices that do not serve as input devices), audio output devices (such as: speakers (809), headphones (not depicted)), visual output devices (such as screens (810) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (800) can also include human accessible storage devices and their associated media such as optical media including CD/DVD ROM/RW (820) with CD/DVD or the like media (821), thumb-drive (822), removable hard drive or solid state drive (823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (800) can also include an interface (854) to one or more communication networks (855). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (849) (such as, for example USB ports of the computer system (800)); others are commonly integrated into the core of the computer system (800) by attachment to a system bus as described below (for example Ethernet interface into a PC computer system or cellular network interface into a smartphone computer system). Using any of these networks, computer system (800) can communicate with other entities. Such communication can be uni-directional, receive only (for example, broadcast TV), uni-directional send-only (for example CANBus to certain CANBus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (840) of the computer system (800).

The core (840) can include one or more Central Processing Units (CPU) (841), Graphics Processing Units (GPU) (842), specialized programmable processing units in the form of Field Programmable Gate Areas (FPGA) (843), hardware accelerators for certain tasks (844), graphics adapters (850), and so forth. These devices, along with Read-only memory (ROM) (845), Random-access memory (846), internal mass storage such as internal non-user accessible hard drives, SSDs, and the like (847), may be connected through a system bus (848). In some computer systems, the system bus (848) can be accessible in the form of one or more physical plugs to enable extensions by additional CPUs, GPU, and the like. The peripheral devices can be attached either directly to the core's system bus (848), or through a peripheral bus (849). In an example, the screen (810) can be connected to the graphics adapter (850). Architectures for a peripheral bus include PCI, USB, and the like.

CPUs (841), GPUs (842), FPGAs (843), and accelerators (844) can execute certain instructions that, in combination, can make up the aforementioned computer code. That computer code can be stored in ROM (845) or RAM (846). Transitional data can also be stored in RAM (846), whereas permanent data can be stored for example, in the internal mass storage (847). Fast storage and retrieve to any of the memory devices can be enabled through the use of cache memory, that can be closely associated with one or more CPU (841), GPU (842), mass storage (847), ROM (845), RAM (846), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (800), and specifically the core (840) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (840) that are of non-transitory nature, such as core-internal mass storage (847) or ROM (845). The software implementing various embodiments of the present disclosure can be stored in such devices and executed by core (840). A computer-readable medium can include one or more memory devices or chips, according to particular needs. The software can cause the core (840) and specifically the processors therein (including CPU, GPU, FPGA, and the like) to execute particular processes or particular parts of particular processes described herein, including defining data structures stored in RAM (846) and modifying such data structures according to the processes defined by the software. In addition or as an alternative, the computer system can provide functionality as a result of logic hardwired or otherwise embodied in a circuit (for example: accelerator (844)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of mesh processing performed in a video encoder, the method comprising:
   determining whether each of a plurality of duplicate vertices is skippable in a mesh of a current frame, each of the plurality of duplicate vertices being a vertex of the mesh that is a duplicate of another corresponding vertex in the mesh, each of the plurality of duplicate vertices and its corresponding vertex having a same reference vertex in a reference frame;

excluding one or more skippable duplicate vertices of the plurality of duplicate vertices in the mesh to generate an updated mesh;

dividing vertices of the updated mesh into a plurality of vertex groups based on a predetermined constant integer, the plurality of vertex groups including a first vertex group;

determining a prediction mode of the first vertex group at least based on estimation errors of vertices in the first vertex group of the updated mesh, each of the estimation errors indicating a difference between a respective vertex in the first vertex group and a corresponding reference vertex in the reference frame; and generating prediction information of the vertices in the first vertex group based on the determined prediction mode of the first vertex group.

2. The method of claim 1, wherein the determining whether each of the plurality of duplicate vertices is skippable further comprises:

based on a first duplicate vertex of the plurality of duplicate vertices and a vertex corresponding to the first duplicate vertex in the mesh having same coordinates, determining the first duplicate vertex of the plurality of duplicate vertices is skippable; and based on a second duplicate vertex of the plurality of duplicate vertices and a vertex corresponding to the second duplicate vertex in the mesh having different coordinates, determining the second duplicate vertex of the plurality of duplicate vertices is non-skippable.

3. The method of claim 2, further comprising:

determining a number of non-skippable duplicate vertices of the plurality of duplicate vertices; and determining a vertex index for each of the non-skippable duplicate vertices of the plurality of duplicate vertices.

4. The method of claim 3, further comprising:

based on one of (i) a number of the plurality of duplicate vertices being equal to or larger than a first threshold, (ii) a number of the vertices in the mesh being equal to or larger than a second threshold, and (iii) a ration between the number of the plurality of duplicate vertices and the number of the vertices in the mesh being equal to or larger than a third threshold, generating coding information that indicates (i) the number of the non-skippable duplicate vertices of the plurality of duplicate vertices and (ii) the vertex index for each of the non-skippable duplicate vertices of the plurality of duplicate vertices.

5. The method of claim 4, wherein:

the number of the non-skippable duplicate vertices is coded based on one of a variable length coding, a fixed length coding, a fixed length code of (b+1) bits, and a fixed length code with a codelength smaller than (b+1) bits, b being a positive integer, and the vertex index for each of the non-skippable duplicate vertices of the plurality of duplicate vertices is coded based on one of a differential coding, the variable length coding, a Exp-Golomb coding, the fixed length code of (b+1) bits, and the fixed length code with the codelength smaller than (b+1) bits.

6. The method of claim 1, wherein the determining the prediction mode of the first vertex group further comprises:

determining the estimation errors of the vertices in the first vertex group of the updated mesh;

determining an average neighboring estimation error of a plurality of neighboring vertices associated with each of the vertices in the first vertex group, each of the plurality of neighboring estimation errors indicating a difference between one of the plurality of neighboring vertices of the respective vertex in the first vertex group and a reference vertex in the reference frame that corresponds to the one of the plurality of neighboring vertices of the respective vertex in the first vertex group;

determining a first cost value based on the estimation errors of the vertices in the first vertex group and a second cost value based on the average neighboring estimation errors associated with the vertices of the first vertex group; and determining the prediction mode of the first vertex group based on a comparison between the first cost value and the second cost value.

7. The method of claim 6, wherein the determining the average neighboring estimation error of the plurality of neighboring vertices further comprises:

determining a first neighboring estimation error associated with a first vertex of the vertices in the first vertex group, the first neighboring estimation error indicating a difference between a first neighboring vertex of the first vertex and a reference vertex in the reference frame that corresponds to the first neighboring vertex of the first vertex;

determining a second neighboring estimation error associated with the first vertex of the vertices in the first vertex group, the second neighboring estimation error indicating a difference between a second neighboring vertex of the first vertex and a reference vertex in the reference frame that corresponds to the second neighboring vertex of the first vertex; and determining the average neighboring estimation error of the first neighboring estimation error and the second neighboring estimation error that is associated with the first vertex of the vertices in the first vertex group.

8. The method of claim 7, wherein the determining the first cost value further comprises:

determining the first cost value as a sum of the estimation errors of the vertices in the first vertex group.

9. The method of claim 8, wherein the determining the second cost value further comprises:

determining an estimation difference between the estimation error of each of the vertices in the first vertex group and the average neighboring estimation error associated with the corresponding vertex in the first vertex group; and determining the second cost value as a sum of the estimation differences associated with the vertices in the first vertex group.

10. The method of claim 9, wherein the determining the prediction mode further comprises:

determining the prediction mode as a first mode based on the first cost value being equal to or less than the second cost value; and determining the prediction mode as a second mode based on the first cost value being larger than the second cost value.

11. The method of claim 10, wherein the generating the prediction information further comprises:

based on the prediction mode being the first mode, generating a first prediction residue for each of the vertices in the first vertex group, the first prediction residue indicating the estimation error of the respective vertex in the first vertex group; and based on the prediction mode being the second mode, generating a second prediction residue for each of the vertices in the first vertex group, the second prediction residue indicating the estimation difference associated with the respective vertex in the first vertex group.

12. An apparatus for mesh processing, the apparatus comprising:
processing circuitry configured to:
determine whether each of a plurality of duplicate vertices is skippable in a mesh of a current frame, each of the plurality of duplicate vertices being a vertex of the mesh that is a duplicate of another corresponding vertex in the mesh, each of the plurality of duplicate vertices and its corresponding vertex having a same reference vertex in a reference frame;
exclude one or more skippable duplicate vertices of the plurality of duplicate vertices in the mesh to generate an updated mesh;
divide vertices of the updated mesh into a plurality of vertex groups based on a predetermined constant integer, the plurality of vertex groups including a first vertex group;
determine a prediction mode of the first vertex group at least based on estimation errors of vertices in the first vertex group of the updated mesh, each of the estimation errors indicating a difference between a respective vertex in the first vertex group and a corresponding reference vertex in the reference frame; and
generate prediction information of the vertices in the first vertex group based on the determined prediction mode of the first vertex group.

13. The apparatus of claim 12, wherein the processing circuitry is configured to:
based on a first duplicate vertex of the plurality of duplicate vertices and a vertex corresponding to the first duplicate vertex in the mesh having same coordinates,
determine the first duplicate vertex of the plurality of duplicate vertices is skippable; and
based on a second duplicate vertex of the plurality of duplicate vertices and a vertex corresponding to the second duplicate vertex in the mesh having different coordinates,
determine the second duplicate vertex of the plurality of duplicate vertices is non-skippable.

14. The apparatus of claim 13, wherein the processing circuitry is configured to:
determine a number of non-skippable duplicate vertices of the plurality of duplicate vertices; and
determine a vertex index for each of the non-skippable duplicate vertices of the plurality of duplicate vertices.

15. The apparatus of claim 14, wherein the processing circuitry is configured to:
based on one of (i) a number of the plurality of duplicate vertices being equal to or larger than a first threshold, (ii) a number of the vertices in the mesh being equal to or larger than a second threshold, and (iii) a ration between the number of the plurality of duplicate vertices and the number of the vertices in the mesh being equal to or larger than a third threshold,
generate coding information that indicates (i) the number of the non-skippable duplicate vertices of the plurality of duplicate vertices and (ii) the vertex index for each of the non-skippable duplicate vertices of the plurality of duplicate vertices.

16. The apparatus of claim 15, wherein:
the number of the non-skippable duplicate vertices is coded based on one of a variable length coding, a fixed length coding, a fixed length code of (b+1) bits, and a fixed length code with a codelength smaller than (b+1) bits, b being a positive integer, and
the vertex index for each of the non-skippable duplicate vertices of the plurality of duplicate vertices is coded based on one of a differential coding, the variable length coding, a Exp-Golomb coding, the fixed length code of (b+1) bits, and the fixed length code with the codelength smaller than (b+1) bits.

17. The apparatus of claim 12, wherein the processing circuitry is configured to:
determine the estimation errors of the vertices in the first vertex group of the updated mesh;
determine an average neighboring estimation error of a plurality of neighboring vertices associated with each of the vertices in the first vertex group, each of the plurality of neighboring estimation errors indicating a difference between one of the plurality of neighboring vertices of the respective vertex in the first vertex group and a reference vertex in the reference frame that corresponds to the one of the plurality of neighboring vertices of the respective vertex in the first vertex group;
determine a first cost value based on the estimation errors of the vertices in the first vertex group and a second cost value based on the average neighboring estimation errors associated with the vertices of the first vertex group; and
determine the prediction mode of the first vertex group based on a comparison between the first cost value and the second cost value.

18. The apparatus of claim 17, wherein the processing circuitry is configured to: determine a first neighboring estimation error associated with a first vertex of the vertices in the first vertex group, the first neighboring estimation error indicating a difference between a first neighboring vertex of the first vertex and a reference vertex in the reference frame that corresponds to the first neighboring vertex of the first vertex;
determine a second neighboring estimation error associated with the first vertex of the vertices in the first vertex group, the second neighboring estimation error indicating a difference between a second neighboring vertex of the first vertex and a reference vertex in the reference frame that corresponds to the second neighboring vertex of the first vertex; and
determine the average neighboring estimation error of the first neighboring estimation error and the second neighboring estimation error that is associated with the first vertex of the vertices in the first vertex group.

19. The apparatus of claim 18, wherein the processing circuitry is configured to:
determine the first cost value as a sum of the estimation errors of the vertices in the first vertex group.

20. The apparatus of claim 19, wherein the processing circuitry is configured to:
determine an estimation difference between the estimation error of each of the vertices in the first vertex group and the average neighboring estimation error associated with the corresponding vertex in the first vertex group; and
determine the second cost value as a sum of the estimation differences associated with the vertices in the first vertex group.

* * * * *